United States Patent
Shrikant Patwardhan et al.

(10) Patent No.: US 12,056,042 B2
(45) Date of Patent: Aug. 6, 2024

(54) SYSTEM AND METHOD FOR SERVERLESS APPLICATION TESTING

(71) Applicant: Accenture Global Solutions Limited, Dublin (IE)

(72) Inventors: Rohit Shrikant Patwardhan, Pune (IN); Mallika Fernandes, Bangalore (IN); Rahul Ghanashyam Joglekar, Pune (IN); Mahesh Venkataraman, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 108 days.

(21) Appl. No.: 17/808,009

(22) Filed: Jun. 21, 2022

(65) Prior Publication Data
US 2023/0297496 A1    Sep. 21, 2023

(30) Foreign Application Priority Data
Mar. 15, 2022    (IN) .............................. 202241014096

(51) Int. Cl.
*G06F 9/44*    (2018.01)
*G06F 9/445*    (2018.01)
*G06F 9/455*    (2018.01)
*G06F 11/36*    (2006.01)

(52) U.S. Cl.
CPC ........ *G06F 11/3688* (2013.01); *G06F 11/368* (2013.01); *G06F 11/3684* (2013.01); *G06F 11/3692* (2013.01)

(58) Field of Classification Search
CPC .............. G06F 11/3688; G06F 11/368; G06F 11/3684; G06F 11/3692
See application file for complete search history.

(56) References Cited

U.S. PATENT DOCUMENTS 10,983,901 B1 *  4/2021  Pearce ................ G06F 11/3688
11,500,763 B1 * 11/2022  Petrescu ............. G06F 11/3692
(Continued)

FOREIGN PATENT DOCUMENTS

| CN | 111488136 A |   | 8/2020 |            |
|----|-------------|---|--------|------------|
| CN | 113220573 A | * | 8/2021 | G06F 11/3684 |

OTHER PUBLICATIONS

Anurag Dwarakanath, Accelerating Test Automation through a Domain Specific Language, 2017, pp. 1-8. https://ieeexplore.ieee.org/stamp/stamp.jsp?tp=&arnumber=7928002 (Year: 2017).*

(Continued)

*Primary Examiner* — Mongbao Nguyen
(74) *Attorney, Agent, or Firm* — Plumsea Law Group, LLC

(57) ABSTRACT

An autonomous system and method of comprehensively testing serverless applications. The system is configured to automatically generate test scripts and test data based on deployed and modified function code and configuration files. The system is configured to work in multi-cloud environments and is able to accommodate any cloud provider. Implementation of such a system can eliminate manual errors. Furthermore, the proposed embodiments are configured to integrate with already existing devOps pipelines for rapid test execution, and can continue automated testing in real-time as modifications to the app are made.

16 Claims, 9 Drawing Sheets

(56) References Cited

U.S. PATENT DOCUMENTS

| | | | |
|---|---|---|---|
| 11,651,272 B2* | 5/2023 | Srivastava | G06F 16/23 |
| | | | 706/12 |
| 11,704,229 B1* | 7/2023 | Li | G06F 11/3684 |
| | | | 717/126 |
| 11,853,196 B1* | 12/2023 | Pandurangarao ... | G06F 11/3688 |
| 2019/0196952 A1* | 6/2019 | Manchiraju | G06F 11/3676 |
| 2019/0318312 A1* | 10/2019 | Foskett | G06F 9/5072 |
| 2020/0201627 A1* | 6/2020 | Pham | G06F 16/9535 |
| 2020/0379891 A1* | 12/2020 | Canter | G06F 8/71 |
| 2021/0133089 A1* | 5/2021 | Khillar | G06F 16/9024 |
| 2022/0309418 A1* | 9/2022 | Chivukula | G06Q 10/0637 |
| 2023/0205678 A1* | 6/2023 | Bollepally | G06F 11/3684 |
| | | | 717/124 |

OTHER PUBLICATIONS

Rashmi Gupta, A keyword-driven tool for testing Web applications, 2014, pp. 1-8. https://ieeexplore.ieee.org/stamp/stamp.jsp?tp=&arnumber=6894287 (Year: 2014).*

Ligia Georgeta Gueilă, Continuous Testing in the Development of IoT Applications, 2019, pp. 1-6. https://ieeexplore.ieee.org/stamp/stamp.jsp?tp=&arnumber=9043692 (Year: 2016).*

* cited by examiner

SYSTEM AND METHOD FOR SERVERLESS APPLICATION TESTING

CROSS-REFERENCE TO RELATED APPLICATION

This application claims the benefit of India Provisional Patent Application Serial No. 2022/41014096 filed on Mar. 15, 2022 and titled "Serverless Application Testing Engine", the disclosure of which is incorporated by reference in its entirety.

TECHNICAL FIELD

The present disclosure generally relates to serverless application testing. More specifically, the present disclosure generally relates to a system and method for generation of test scenarios along with test scripts for process flows executed in serverless environments.

BACKGROUND

Serverless computing is a cloud computing execution model in which the cloud provider allocates machine resources on demand, taking care of the servers on behalf of their customers. However, although the model is described by the term "serverless", servers are still used by cloud service providers in these cases to execute code for developers. However, developers of serverless applications are not concerned with capacity planning, configuration, management, maintenance, fault tolerance, or scaling of containers, VMs, or physical servers. Serverless computing does not hold resources in volatile memory; computing is rather done in short bursts with the results persisted to storage. When an app is not in use, there are no computing resources allocated to the app. Thus, pricing is based on the actual amount of resources consumed by an application.

Serverless computing can simplify the process of deploying code into production. In addition, serverless code can be used in conjunction with code deployed in traditional styles, such as microservices or monoliths. Alternatively, applications can be written to be purely serverless and use no provisioned servers at all. However, with this approach, integration tests become a vital aspect the validation process to ensure the mechanism is set up correctly and working. Improvements in serverless execution frameworks will drive the further development and implementation of flexible functionality into the cloud. Furthermore, development of the serverless applications is currently done locally using frameworks provided by all major cloud providers like AWS® SAM, Azure® Functions Core Tools, etc., which allow developers to simulate the cloud services locally for the development purpose. A major drawback with these frameworks is that they only work with their respective cloud provider. In addition, within these systems, human testers are simply unable to determine whether a particular function is already included, because many of these functions are triggered or linked to other functions. This means the function is not exposed in the API, preventing user-friendly testing of the functions.

There is a need in the art for a system and method that addresses the shortcomings discussed above.

SUMMARY

The proposed systems and methods describe an automated, adaptive process for testing serverless applications. The system and method solve the problems discussed above by providing a cloud platform-agnostic mechanism by which to generate test scripts and test data for function code and execute said test scripts to validate the code. The system is configured to test applications executed across multi-cloud environments and is able to accommodate any cloud provider. These features (among others described) are specific improvements in way that the underlying computer system operates. A human tester, for example, cannot determine whether a particular function is already included, because many of these functions are triggered or linked to other functions. This means the function is not exposed in the API, preventing user-friendly testing of the functions. In contrast, in some embodiments, the serverless application testing engine can determine which parts of a given code were covered (tested) during the unit testing, as well as which part were not covered. The improvements facilitate a more efficient, accurate, consistent, and precise development of applications that can offer significantly greater test coverage than conventional testing approaches. The proposed serverless application testing system offers an improvement on conventional unit testing. The serverless application testing can then automatically generate scripts for the uncovered aspects of the code.

In one aspect, the disclosure provides a computer-implemented method for autonomous serverless application testing. The method includes a first step of receiving, at an analyzer module of a serverless application testing system, a first configuration file associated with a first function, and a second step of extracting, at the analyzer module, a plurality of keywords from the first configuration file. The method also includes a third step of passing, from the analyzer module and to an author module of the serverless application testing system, the plurality of keywords, and a fourth step of generating, via the author module and based on the plurality of keywords, a first test script. In addition, the method includes a fifth step of receiving, at a sprinter module of the serverless application testing system, the first test script from the author module, and a sixth step of—responsive to receiving the first test script—executing a first test via the sprinter module based on the first test script.

In another aspect, the disclosure provides a non-transitory computer-readable medium storing software comprising instructions executable by one or more computers which, upon such execution, cause the one or more computers to: (1) receive, at an analyzer module of a serverless application testing system, a first configuration file associated with a first function; (2) extract, at the analyzer module, a plurality of keywords from the first configuration file; (3) pass, from the analyzer module and to an author module of the serverless application testing system, the plurality of keywords; (4) generate, via the author module and based on the plurality of keywords, a first test script; (5) receive, at a sprinter module of the serverless application testing system, the first test script from the author module; and (6) responsive to receiving the first test script, execute a first test via the sprinter module based on the first test script.

In yet another aspect, the disclosure provides a system for autonomous serverless application testing, the system comprising one or more computers and one or more storage devices storing instructions that may be operable, when executed by the one or more computers, to cause the one or more computers to: (1) receive, at an analyzer module of a serverless application testing system, a first configuration file associated with a first function; (2) extract, at the analyzer module, a plurality of keywords from the first configuration file; (3) pass, from the analyzer module and to an author module of the serverless application testing system, the plurality of keywords; (4) generate, via the author module and based on the plurality of keywords, a first test script; (5) receive, at a sprinter module of the serverless application testing system, the first test script from the author module; and (6) responsive to receiving the first test script, execute a first test via the sprinter module based on the first test script.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
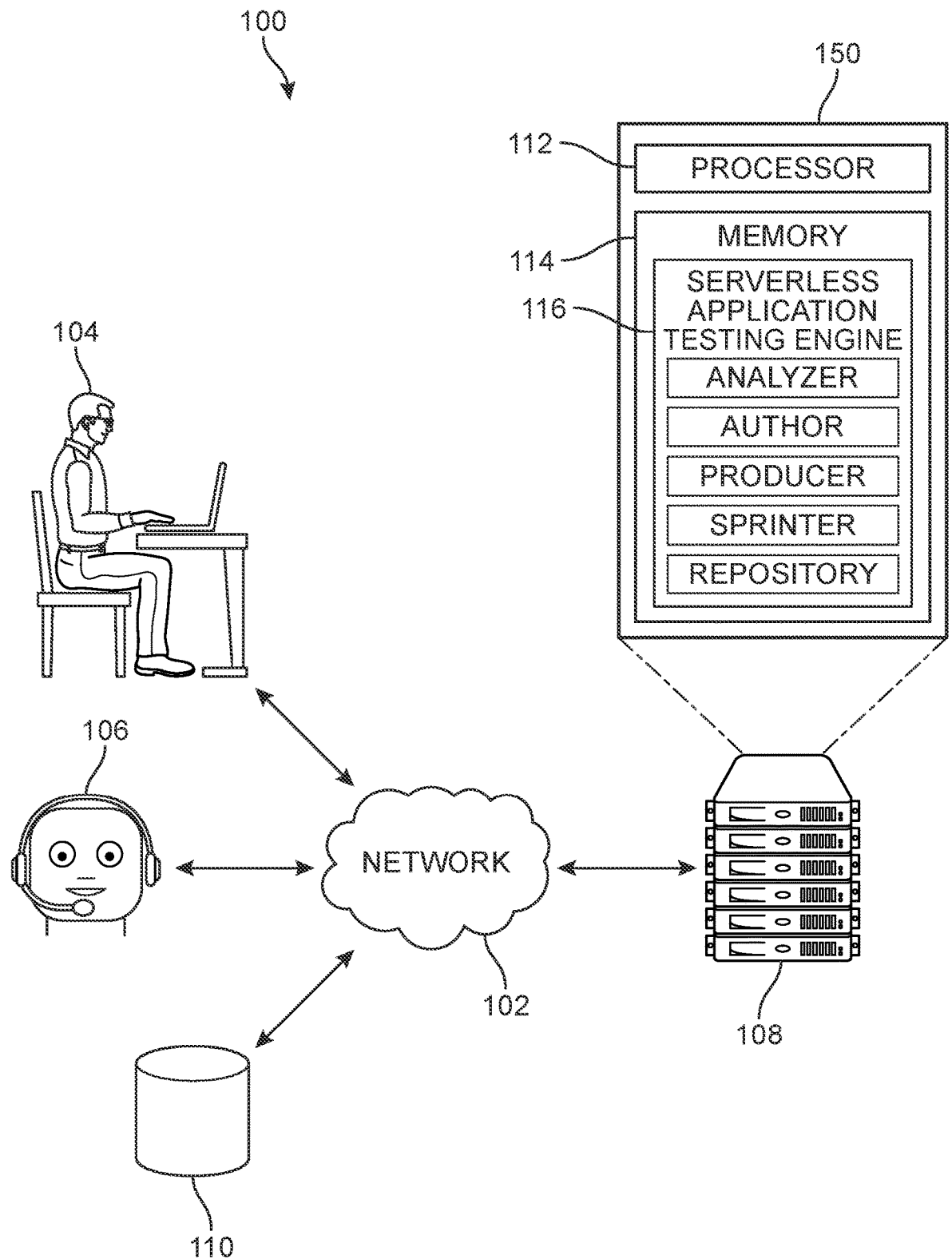
FIG. 1 is a diagram of an example environment in which systems and/or methods, described herein, may be implemented, according to an embodiment.

Successfully deploying resources into the cloud is a constantly increasing technical challenge as more cloud service providers emerge, each offering disparate computing platforms, services, assets, supported technical components, and other features, including serverless execution. Serverless cloud systems may allow operators to run a routine, execute an application, or perform other types of computational tasks (e.g., serverless tasks) without necessarily requiring the operator to first define a virtual system or requisition specific hardware on which to perform the computational task. The architecture implements orchestration of a variety of tools to achieve the deployment of, especially, serverless resources and code functions, and enables them to function together in the same environment. Accordingly, an operator may request the performance of a serverless task without designating any particular hardware or virtualized hardware on which the serverless task should run.

However, as noted above, validation of a system architecture in serverless systems has remained challenging. These tests are in part complex because serverless apps are dependent on cloud service infrastructure providers. In different embodiments, the infrastructure providers provide computing resources through delivery platforms that are generally publicly available. Infrastructure providers may additionally or alternatively provide computing resources "on-premises", which typically refers to a location inside the enterprise that uses the resources, often including increased privacy, security, and control compared to public cloud resources. Examples of infrastructure providers and brokers to such providers include Amazon® Google®, Microsoft®, and Accenture®, etc., who offer, e.g., Amazon® Web Services (AWS), Google® Compute Engine (GCE), Microsoft® Azure (Azure), and Windows® Azure Pack (WAP), as just a few examples. Both unit and integration tests can be difficult, especially in terms of testing of mocking and stubbing services that determine whether an application is working correctly in relationship with a given infrastructure provider. Integration tests are more difficult as there are multiple services/components integrated together, which increases the risk of creating configuration and setup bugs (in addition to the potential existing code defects).

Currently, there is heavy dependency on unit testing (which represents the cheapest option) for serverless applications and functions. Integration testing, while more thorough, is very difficult because of the architecture complexity of the serverless applications (as there are thousands of services from cloud providers). Finally, functional or UI (user interface) based testing is possible only in cases of black box testing. If there is no UI, black box testing cannot occur. Unfortunately, many serverless applications do not have a UI layer. Instead, many of the functions only have a logic layer. In such a scenario, it is very difficult for a human tester to understand and perform the testing. In these cases, only API testing can be performed. These challenges lead to extra efforts in executing redundant or unwanted tests, uncertainty due to complex architecture, limited testing in case of UI as black box testing not possible, and sub optimal productivity and risk of defect leakage.

As a more specific example, in some implementations, the infrastructure provider may be AWS (Amazon® Web Services), providing the AWS Lambda serverless execution environment, the infrastructure as code execution tool may be the Terraform™ tool, and the code loading tool for serverless functions may be the Apex™ tool. These examples are used for the purposes of illustration below, and other implementations may be configured for different infrastructure providers and different tools. There are many technical challenges involved with building infrastructure in a serverless execution framework, e.g., AWS® Lambda. Serverless execution frameworks face the unique challenge that it can be very unpredictable when resources can be active and when serverless code needs to run. Further, the serverless nature of execution means that the infrastructure resources instantiated for any given developer may vary over time.

Thus, a serverless execution environment can be configured to execute functions (e.g., Lambda functions). The functions are invoked when required, providing and running cloud compute services on as-needed basis, and maintenance of the environment is handled by the cloud provider. Typically, in shifting an application ("app") to a serverless environment, the app can be split into a plurality of functions that each serve or relate to a different app function. The app can be understood to comprise a series of smaller functions that work as a collective when deployed. As the architecture grows, it can become increasingly complex, and functional testing by human testers less reliable, and more inefficient.

For example, as a general matter, these serverless functions do not have user interfaces (UIs) associated with them. If, for example, a function which generates a job in the queue management or which sends a notification is created, and a developer wishes to test only that particular function, there is no UI available, making a simple functional testing of the function infeasible. Indeed, from the point of view of the system architecture, a human tester will simply not be able to determine whether this particular function is already included. This is in part because many of these functions are triggered or linked to other functions, so they are not exposed in the API, preventing user-friendly testing of the functions.

These issues have led to a testing approach that is heavily dependent on unit testing. In other words, whenever a developer is developing a particular function (locally), the developer will engage in unit testing. However, the developers will not be able to check all of the scenarios or all of the conditions. As an illustrative example, if a function is written, which sends a notification to a client through email, the developer will test that by adding an email address, and verifying whether that notification is being sent. Yet, if the email 'handle' he or she has inputted in incorrect, the unit testing will fail. Because of the dependency on the unit testing, far less validation coverage is actually achieved during the unit testing. Meanwhile, system and integration testing can be done once it is deployed to cloud, but only for the functions where the API is publicly available. For example, if there is a function which allows the users to add a claim via a user interface, a functional test can be performed. On the other hand, functions where the API is not publicly available cannot be tested. In order to perform the system and integration test in such cases, the developer team will need to write down their own API script, which is a time-intensive task, and so is generally omitted. In other words, after deployment, since there is no visibility of all of the functions, there is no mechanism by which testers will be able to manually perform end-to-end testing. Thus, with respect to serverless app maintenance, or enhancements to the currently deployed functions, a human tester must manually make changes, and again rely heavily on the unit testing.

The proposed embodiments describe a serverless application testing engine, method, and system that can operate in conjunction with an existing serverless architecture. A Jest framework (or other similar types of testing frameworks) can fetch the required information created during development or local tests and send the information to the serverless application testing system. References to the Jest framework should be understood to correspond more generally to available unit testing frameworks.

In response, the serverless application testing system generates test scenarios along with test scripts, which in some embodiments, can be edited by user for better coverage. In addition, in one embodiment, the serverless application testing system can trigger a Robot Framework (or other test automation framework for acceptance testing and acceptance test-driven development) to automatically initiate the testing once the code is deployed through the continuous integration/continuous delivery (CI/CD) pipeline. References to the Robot framework should be understood to correspond more generally to available automation testing frameworks that can execute scripts. The serverless application testing can allow developers to carry out automated black box testing using inputs from unit testing with better transparency.

As will be disclosed herein, the serverless application testing system can provide end-users with greater control over their software environment, user-friendly monitoring dashboards, and automated authoring of test scenarios and functions. The proposed system will ensure that a given app can work properly in a live environment as it interacts with the selected cloud service provider. It should be understood that unlike other test frameworks, the proposed systems are configured to be 'cloud-agnostic' and work with all cloud platforms such as AWS®, Microsoft Azure® Google Cloud Platform®, etc. In different embodiments, the system can include five modules: (a) analyzer module, (b) author module, (c) producer module, (d) sprinter module, and (e) repository module.

For purposes of reference, FIG. 1 presents a schematic diagram of a serverless automation testing environment 100 (or environment 100), according to an embodiment. The environment 100 may include a plurality of components capable of performing the disclosed computer implemented method of testing apps in serverless frameworks (e.g., method 1000). For example, environment 100 includes a first user device 104, a virtual agent 106, a computing system 108, a network 102, and a knowledge base 110. The components of environment 100 can communicate with each other through network 102. For example, first user device 104 may communicate with virtual agent 106 via network 102. In some embodiments, network 102 may be a wide area network ("WAN"), e.g., the Internet. In other embodiments, network 102 may be a local area network ("LAN").

As shown in FIG. 1, a serverless application testing engine 116 may be hosted in computing system 108, which may have a memory 114 and a processor 112, together comprising a serverless application testing system 150 (or system 150). Processor 112 may include a single device processor located on a single device, or it may include multiple device processors located on one or more physical devices. Memory 114 may include any type of storage, which may be physically located on one physical device, or on multiple physical devices. In some cases, computing system 108 may comprise one or more servers that are used to host the serverless application testing engine 116 and its associated modules (analyzer, author, producer, sprinter, repository). Knowledge base 110 may store data that may be retrieved by other components for system 150.

While FIG. 1 shows a single user device, it is understood that more user devices may be used. For example, in some embodiments, the system may include two or three user devices. The user may include an individual seeking guidance on how to perform a particular task or understand a specific concept. In some embodiments, the user device may be a computing device used by a user. For example, first user device 104 may include a smartphone or a tablet computer. In other examples, first user device 104 may include a laptop computer, a desktop computer, and/or another type of computing device. The user devices may be used for inputting, processing, and displaying information. Virtual agent 106 may be a chatbot capable of communicating with first user device 104. For example, virtual agent 106 may conduct a chat with first user device 104 in which virtual agent 106 offers to walk the user through a particular sequence of steps via the user interface.

The number and arrangement of components shown in FIG. 1 are provided as an example. In practice, the system may include additional components, fewer components, different components, or differently arranged components than those shown in FIG. 1. Additionally, or alternatively, a set of components (e.g., one or more components) of the system may perform one or more functions described as being performed by another set of components of the environment 100.

Figure 2:
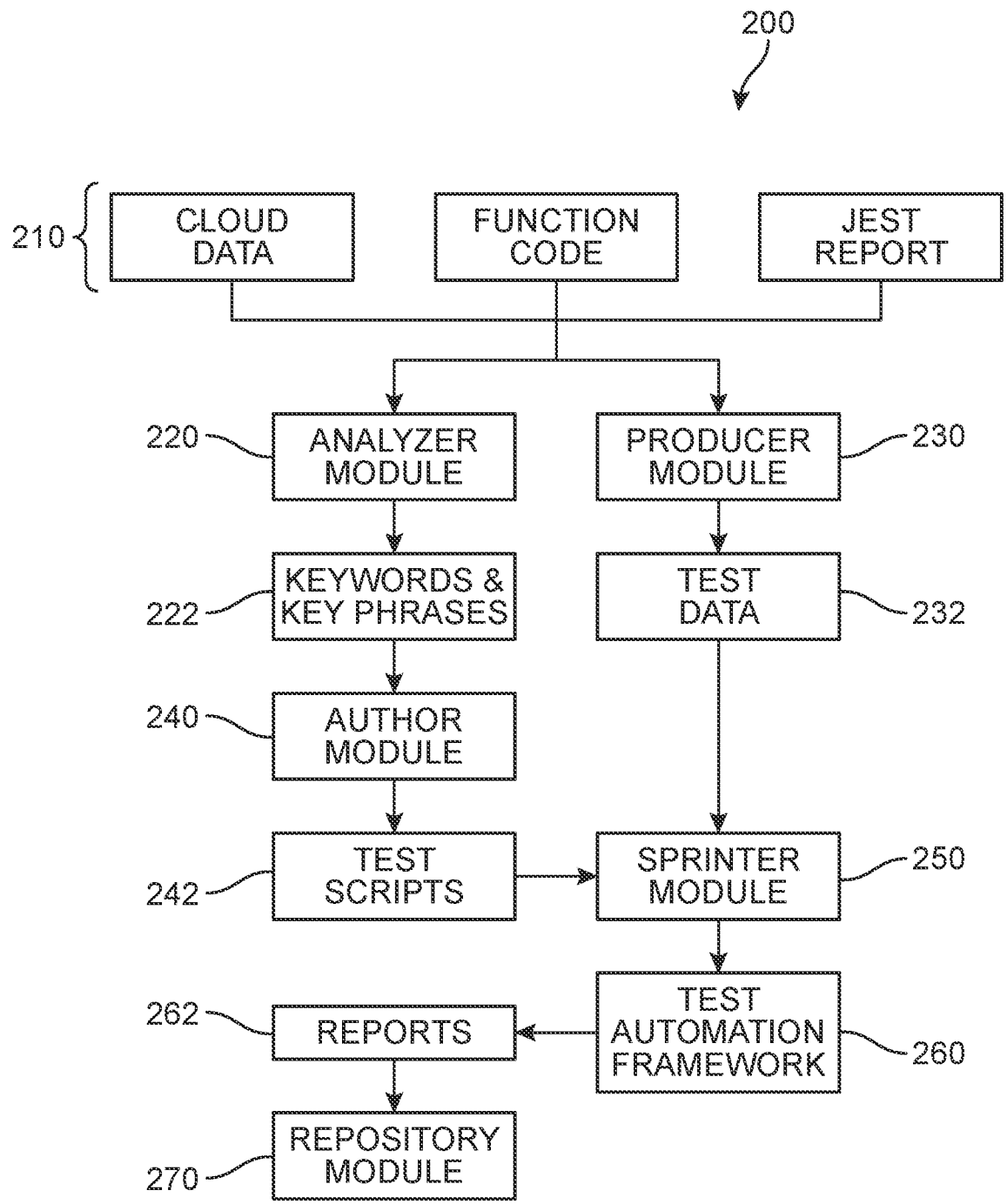
FIG. 2 is a flow diagram of an embodiment of a process of generating test scripts and automatically testing app functions in a serverless environment, according to an embodiment.

For purposes of introduction, FIG. 2 shows an overview 200 of the disclosed method of automatically testing functions of an app running in a serverless framework, according to an embodiment. Generally, at a high level, the disclosed method may include receiving, by an analyzer module 220, a plurality of input data 210 comprising data related to the cloud platform, function code for the app, and the Jest report. The analyzer module 220 extracts keywords and key phrases for ingestion by author module 240. Some or all of the input data 210 is also received by a producer module 230. The producer module 230 outputs test data 232.

The author module 240 outputs test scripts 242 directed toward testing functions of the code that were previously untested. The test data 232 and test scripts 243 are then submitted to a sprinter module 250 which executes the scripts in a test automation framework 260. The results of the tests, as reports 262, are then stored in a repository module 270. Additional details regarding the serverless application testing system, including each of its five modules, will now be provided below.

Figure 3:
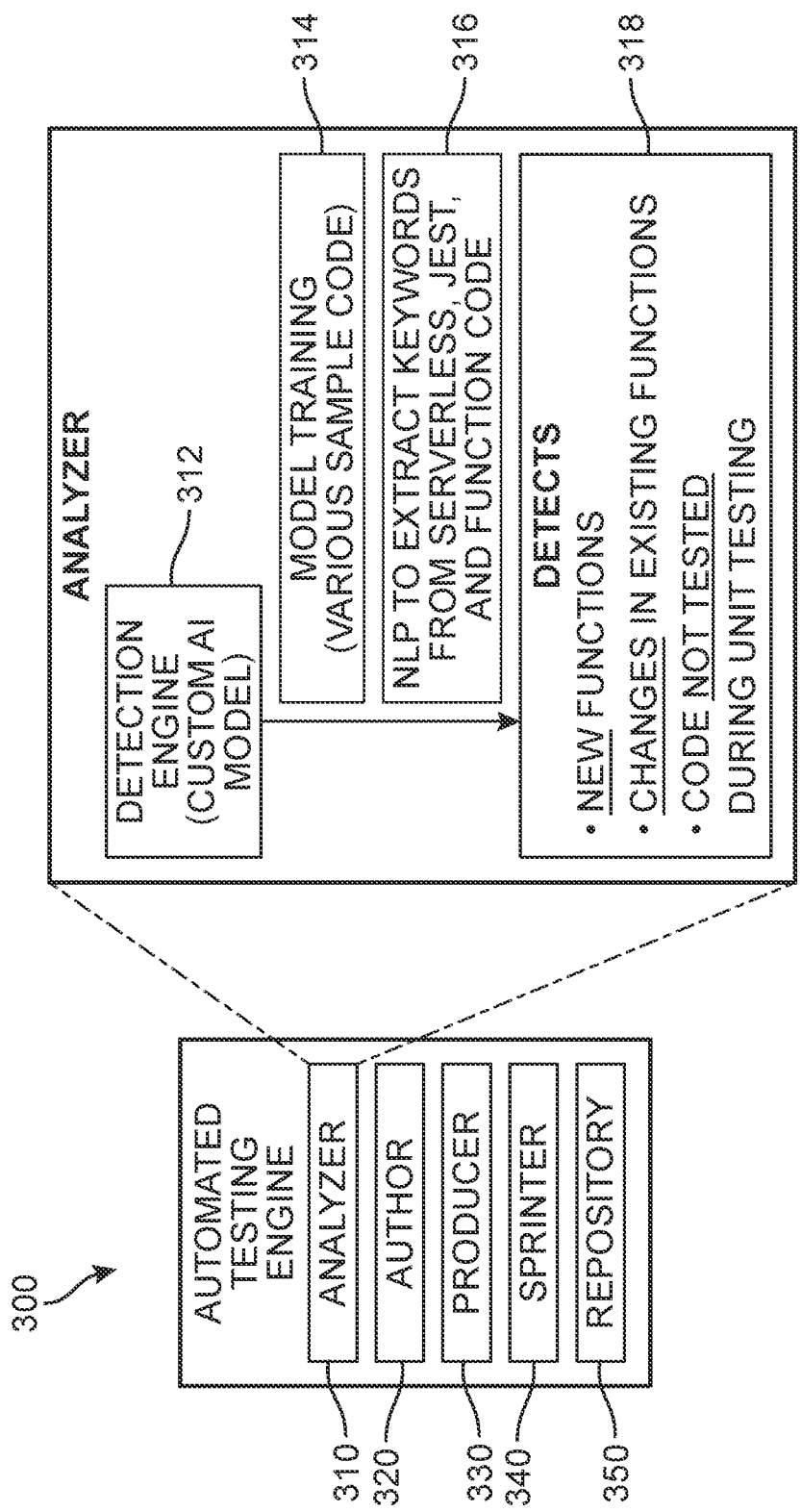
FIG. 3 is a schematic diagram of an embodiment of the serverless application testing system with details regarding its analyzer module, according to an embodiment.

Referring now to FIG. 3, an embodiment of a serverless application testing system ("system") 300 is presented, including an automated testing engine that comprises an analyzer module 310 (may also be referred to as a function handler), an author module 320, a producer module 330, a sprinter module 340, and a repository module 350. In different embodiments, the analyzer module 310 scans the information from the unit test file and the function code itself. As developers develop their functions locally using the serverless framework, and select a framework for unit testing (e.g., Jest, Mocha, Selenium, AVA, Enzyme, Jasmine, Cypress, Chai, etc.), the automated testing engine can obtain the information generated by the unit testing, including but not limited to the cloud provider details (i.e., which cloud(s), what is the function, whether it is a distributed cloud environment, whether there are multiple developer sources, what is the region, what is the API URL (Uniform Resource Locator) for them, which language is used (developers can use many languages, such as node.JS, Python, React, AngularJS, PHP, Java, etc.), what stage (development stage, test environment, production environment, demo), what is the stack, what is the API name, etc.). Thus, the serverless application testing system fetches a YML file from a serverless framework and uses its "parser" to extract information from the YML (configuration file). An example of this extracted data is shown below:

name: aws
runtime: nodejs14.x
stage: dev
region: us-east-1
stackName: custom-stack-name
apiName: custom-api-name
websocketsApiName: custom-websockets-api-name
websocketsApiRouteSelectionExpression: $request.body.route
profile: production
memorySize: 512
timeout: 10
logRetentioninDays: 14
kmsKeyArn: arn:aws:kms:us-east-1:XXXXXX:key/some-hash In addition, the outputted file from the testing framework (e.g., the Jest file) is received by the serverless application testing system, which evaluates the results. In some embodiments, the serverless application testing system identifies what the unit test has determined, and what aspects have been tested. Furthermore, the serverless application testing system can identify which aspects were not tested (e.g., incorrect email ID scenario described above).

As shown in the expanded view of FIG. 3, in different embodiments, the analyzer module 310 implements an artificial intelligence (AI) analyzer model that is employed by its detection engine 312. The model is configured to extract certain keywords and key phrases, and can then determine whether a given function is a new function, what was tested, what was not tested, etc. In a first stage 314, the model can be trained and reinforced using various sample code (serverless, Jest, function code, etc.). The analyzer module 310 can receive three inputs: (1) serverless framework data regarding cloud deployment and what functions have been deployed using which cloud service, in what region, what is the API gateway, aspects related to the cloud, other configuration or YML files; (2) the Jest report, which allows the analyzer to understand the unit testing coverage (what parts were already tested); and (3) the actual function code, from which the analyzer module 310 extracts parameters, which are then compared with the Jest report, thereby determining which parts were not tested and which parts were tested. In a second stage 316, the detection engine 312 can use natural language processing techniques to perform an extraction of key words from the three sources. Thus, in some embodiments, the analyzer module 310 can evaluate the app's code, find what has not yet been tested, for example by matching what has been tested with parts of the code and identifying that and then identifying what is not tested, and then automatically determines if it needs to build the missing test(s) which informs the author module's activity and output.

As shown in a third stage 318 of FIG. 3, once the detection engine 312 receives the code(s), the model can output extracted keywords that each represent detection of one or more of the following: (a) new functions; (b) changes in existing functions; and (c) code lines not tested during unit testing. Thus, as an example, upon deployment of an enhanced (updated) function, the automated testing engine is configured to detect that the function has been updated or modified. Based on the Jest code and the function code, the analyzer module 310 extracts the keywords from the function and verifies or compares it with reference to the earlier version of the code. After the analyzer module 310 uses NLP (natural language processing) techniques to extract certain keywords and key phrases reflecting these changes, the output is passed it the author module 320, as discussed now in FIG. 4.

In different embodiments, the analyzer module 310 passes all of the extracted information like keywords from new functions, changed functions, serverless framework information from the configuration (e.g., YML) file, code lines which are not tested during unit testing, etc. to the author module 320. As shown in the expanded view of FIG. 4, the author module 320 implements a machine learning model to generate an API script. The script can be generated regardless of the scenario conditions and developer language(s). In one embodiment, the script can be outputted in a format that aligns with the selected test automation framework (e.g., Robot).

Figure 4:
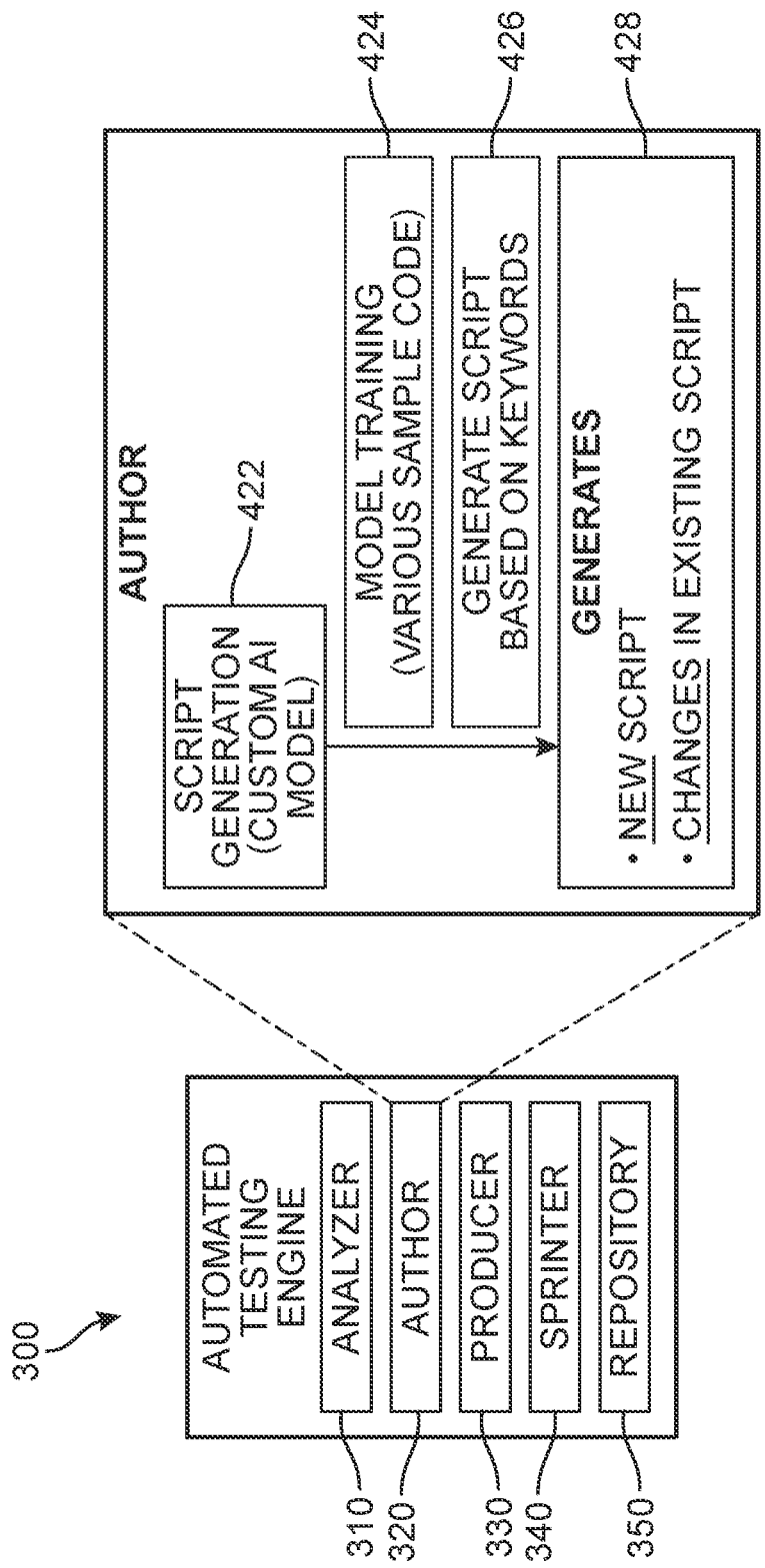
FIG. 4 is a schematic diagram of an embodiment of the serverless application testing system with details regarding its author module, according to an embodiment.

In different embodiments, the author module 320 is configured to automatically generate the API scripts for all of the identified functions. The script can be used for testing the function(s). In one example, the author module 320 uses an AI script generation model 422 to generate scripts using the keywords that were extracted through the analyzer module 310. In such an example, in some embodiments, author module 320 can utilize templates that author module 320 fills with keywords extracted through analyzer module 310. As shown in FIG. 4, in a first stage 424, the script generation model 422 is trained using various serverless function code keywords. The trained script generation model 422 can then begin generating scripts based on the keywords in a second stage 426. Such script generation can include either or both of (a) new scripts and (b) changes to existing script(s), as shown in a third stage 428.

Thus, the author module 320 is configured to evaluate whether any new functions have been developed and deployed for the app, and generate a new script for each of these new functions, as well as update already-generated scripts when appropriate. For example, in a case where a first function has been deployed on the cloud, but subsequently undergoes some change(s) (e.g., enhancements and/or or some new functionality), the author module 320 can proceed to modify the previously existing script that had been previously generated for the original (first) function. In other words, as the first function is already deployed, it can be understood to have been previously processed by the serverless application testing system, where the script generation model 422 had been requested to generate the script for it.

However, as functionality is added to the first function, for example, as new parameters are included in the first function, it becomes a modified first function. The change(s) are detected by the analyzer module 310, as noted in FIG. 3 In other words, while there is an existing script for the original first function, a particular parameter has been added or may have been deleted, and the first function has changed. In different embodiments, the analyzer module 310 sends updated information—detecting and reporting these changes—to the author module 320. The author module 320 then specifically identifies what has changed and, in response, generates and implements a change to the existing script. In other words, the author module 320 automatically edits or 'heals' the script(s) without any manual intervention.

Thus, in cases where the developer has not done the complete unit testing, the analyzer module 310 detects which part of the code was not tested during unit testing, and passes that information to the author module 320, which generates additional scripts for testing what had been the untested aspects during unit testing, thereby improving the app's validation coverage to its maximum.

As a more specific example, in cases where a unit test did not detect failures for an email ID or a failed email notification, the analyzer module 310 can identify this with keywords extraction and, based on the extracted keywords, the author module 320 to generate a script with a wrong email ID so that the test can actually present that failure, thereby ensuring the app is indeed receiving the proper response.

For purposes of clarity, a non-limiting example of a sample Robot script generated by the proposed system 300 is presented below:
* Settings *
Library Requestslibrary
* Test Cases *
get_player_score
   create session test_session https://jhin7dt269.execute-api.us-east
   1.amazonaws.com/dev/get-player-score/120
   ${response}=get request test_session https://jhin7dt269.execute-api.us-east-I.amazonaws.com/dev/get-player-score/120
   ${status_code}=convert to string ${response.status_code}
   should be equal ${status_code} 200
   ${response_body}=convert to string ${response.content}
   should be equal ${response_body} {"user":{"ID": "120", "score":95}}

Figure 5:
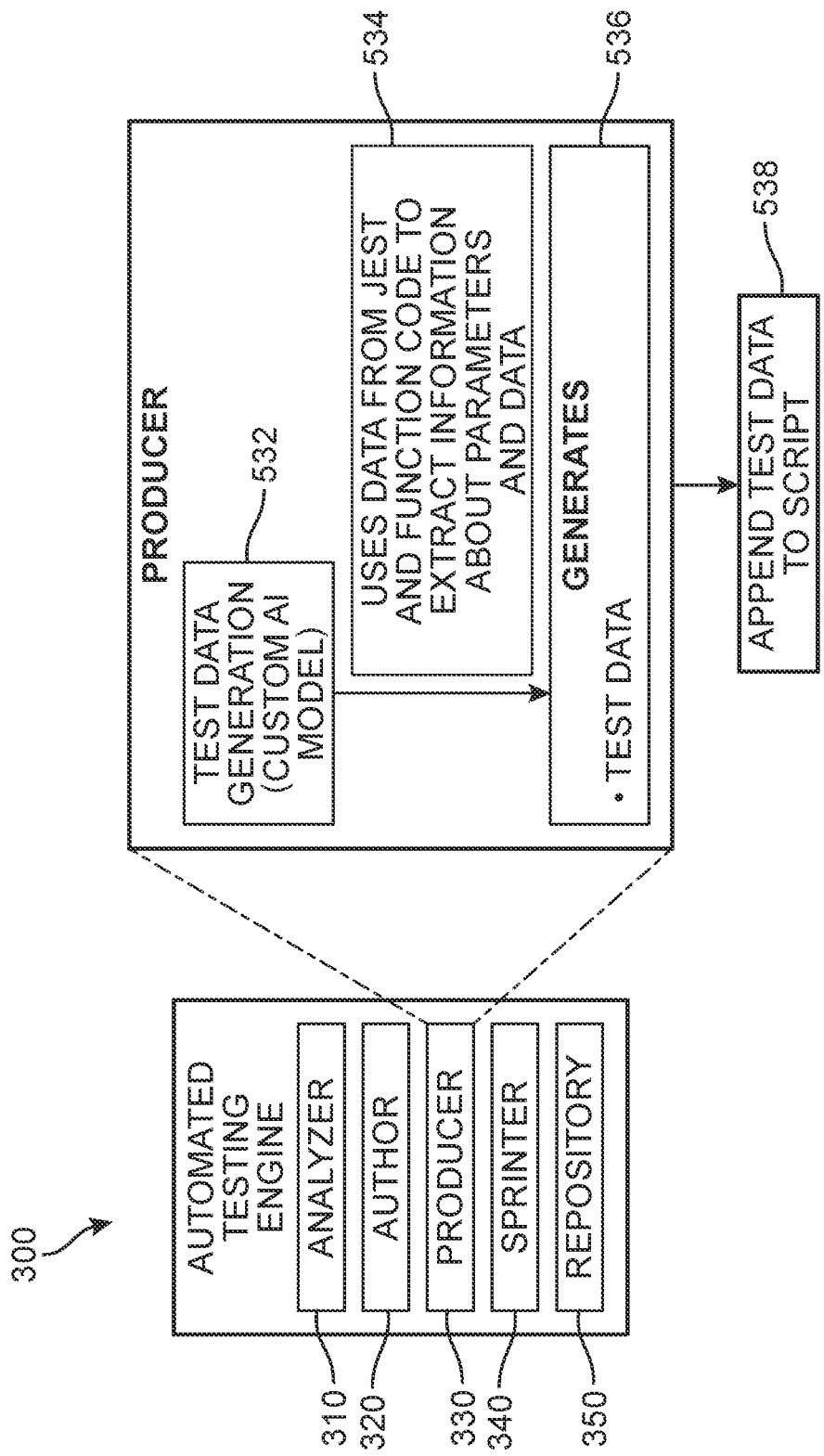
FIG. 5 is a schematic diagram of an embodiment of the serverless application testing system with details regarding its producer module, according to an embodiment.

As a general matter, many functions that are created for a given app can require a plurality of parameters. A few non-limiting parameter examples in the context of insurance claims can include email ID, policy number, address, vehicle number, etc. In different embodiments, the proposed system 300 is configured to automatically produce test data that can be used to comprehensively test the generated script(s). Referring to the expanded view shown in FIG. 5, in some embodiments, the producer module 330 can generate the test data for all of the parameters required by the given functions. An AI test data generation model 532 is developed which extracts information such as number of characters, data type (e.g., numeric, alpha-numeric, email address, and so forth), etc. from Jest data and/or function code in a first stage 534. Once test data generation model 532 extracts this information, the producer module 330 uses random generation logic to generate test data for the various parameters in a second stage 536.

Figure 6:
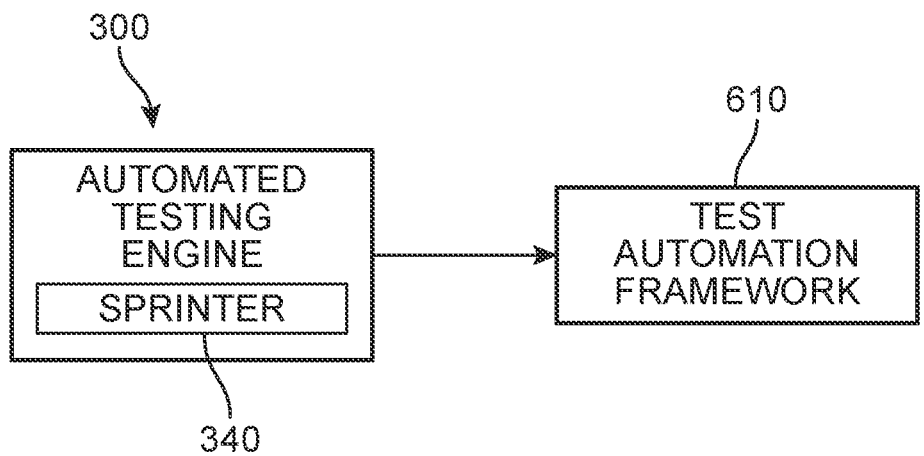
FIG. 6 is a schematic diagram of an embodiment of the serverless application testing system with details regarding its sprinter module, according to an embodiment.

In different embodiments, this test data is then appended to or embedded in the script that has been (previously, concurrently, or subsequently) generated by the author module 320 in a third stage 538. These updated or augmented scripts are then sent to the sprinter module 340. Referring to FIG. 6, in different embodiments, sprinter module 340 is configured to 'talk' or otherwise exchange and/or translate data with a test automation framework 610 (e.g., Robot, Cypress, Selenium, Cucumber, TestNG, Gauge, pytest, behave, etc.). The sprinter module 340 triggers the automation framework 610, and passes the updated scripts to it. In turn, the automation framework 610, using an API gateway, calls all of these scripts. In some embodiments, the sprinter module 340 is configured to initiate this exchange of data automatically once (a) the scripts have been generated by the author module and (b) the test data has been generated by the producer module. After the sprinter module 340 receives the appended scripts, it can automatically send the data to the test automation framework 610 (e.g., residing on the cloud) and trigger its operation such that the automation framework 610 executes the scripts.

Figure 7:
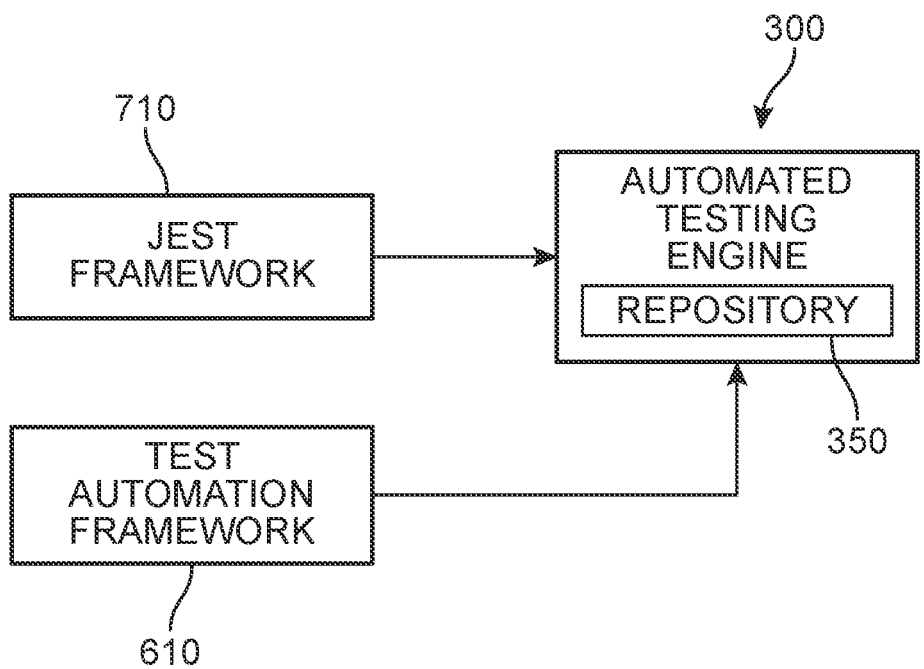
FIG. 7 is a schematic diagram of an embodiment of the serverless application testing system with details regarding its repository module, according to an embodiment.

Finally, as shown in FIG. 7, the automation framework 610 (e.g., Robot) can send a first report back to the system 300. The repository module 350 can receive and store the test information for users to review the latest or historical reports. Furthermore, the system 300 receives a second report from Jest framework 710 (i.e., the original unit test data that was produced pre-deployment). The repository module 350 can store the data from both of these reports. In different embodiments, the reports can indicate whether the tests failed or succeeded/passed, as well as other operational details such as what the parameters were and what data was used, described further below. Simply for purposes of illustration, one non-limiting example of a sample Robot report generated in response to the test scripts and test data provided by the proposed system 300 is presented below.

Get-Player-Score #2021-06-25-093057-348 Input Log
Generated
20210625 15:01 24 UTC•05 30
19 days 21 hours ago
Test Statistics
Total Statistics
  All Tests
    Total=1, Pass=0, Fail=1, Skip=0, Elapsed=00:00:01
Statistics by Tag
  No Tags
Statistics by Suite
  Get-Player-Score #1011-06-15-093057-348 Input
    Total=1, Pass=0, Fail=1, Skip=0, Elapsed=00:00:01
Test Execution Errors
20210625150123777 [WARN] Keyword ' Requestslibrary. Get Request' is deprecated.
Please use 'GET On Session instead.
Test Execution Log
[SUITE]—Get-Player-score   #1011-06-15-093057-348 Input
Full Name: Get-Player-Score #1011-06-15-093057-348 Input
Source:  D:  \rtaplqe  cloud|documents|get-player-score_#_2021-06-25-093057-348
_input.robot
Start |End| Elapsed: 20210625 15:01:23.528/20210625 15:01:24.452/00:00:00.924
Status: 1 test total, 0 passed, 1 failed, 0 skipped
Summary Information
  Status: 1 test failed
  Start Time: 2021062515:01:23.528
  End Time: 2021062515:01:24.462
  Elapsed Time: 00:00:00.924
  Log File: get-player-score_%23_2021-06-25-093057-348 log.html As described herein, in different embodiments, the serverless application testing system 300 automatically generates scripts for the functions which were already exposed to public API, as well as the scripts for the functions which are not publicly exposed. This process occurs as through 'self-filling' script mechanism, without any manual intervention. The serverless application testing system 300 (or system 300) then triggers execution of all of these scripts, which are executed via the cloud provider(s) environment by automation framework 610. In other words, along the CI/CD pipeline, the serverless application testing system can 'understand' when code is deployed on the cloud, and in response can trigger the script generation/update automatically.

It should further be appreciated that the proposed system 300 is able to accommodate testing of functions triggered within functions (state functions), even when these functions are dependent on multiple, different cloud services, which a manual tester would be unable to handle. This process represents a completely autonomous testing paradigm for serverless architectures. With the integration of system 300 into the architecture of a serverless app environment, whenever a deployment occurs along the CI/CD pipeline, the system 300 can be automatically triggered. The analyzer module can be activated, and detect new functions or new function changes in the existing app. If it finds (for example) that a new field is added, then the analyzer module can cause the author module to update the script in order to include this new field. The producer module can add the value to be tested for the new field. In one embodiment, this value is taken from the Jest expect statement, and the producer module generates new values for each parameter. This sequence of testing represents an automated self-healing of the script, preventing defects at production.

However, as described herein, the analyzer module 310 of the serverless application testing engine can determine that this is a new function (making payment via UPI), and a notification can be presented, as shown on page A16. Thus, the serverless application testing system is configured to recognize that a change has occurred in the existing function of AWS and determine only ~25% coverage was achieved for this new function during the unit testing, as well as what part of the code was not tested during unit testing. Based on this information, the author module 320 begins to generate the necessary scripts. The author module 320 works within a knowledge context that some new parameter ('product priority') has been added into the existing script. The script is generated for this new function, as well as two additional scripts, are used to improve coverage from 25% to more than 90%.

Following this stage, the producer module begins to generate the test data for different parameters used in all of these functions. All of these scripts, with the test data, are then sent to the Robot framework, which executes the scripts through gateway on the cloud itself. Once the scripts are executed, the report produced by the Robot framework is sent back to the serverless application testing engine. An example report is shown on page A17.

Figure 8:
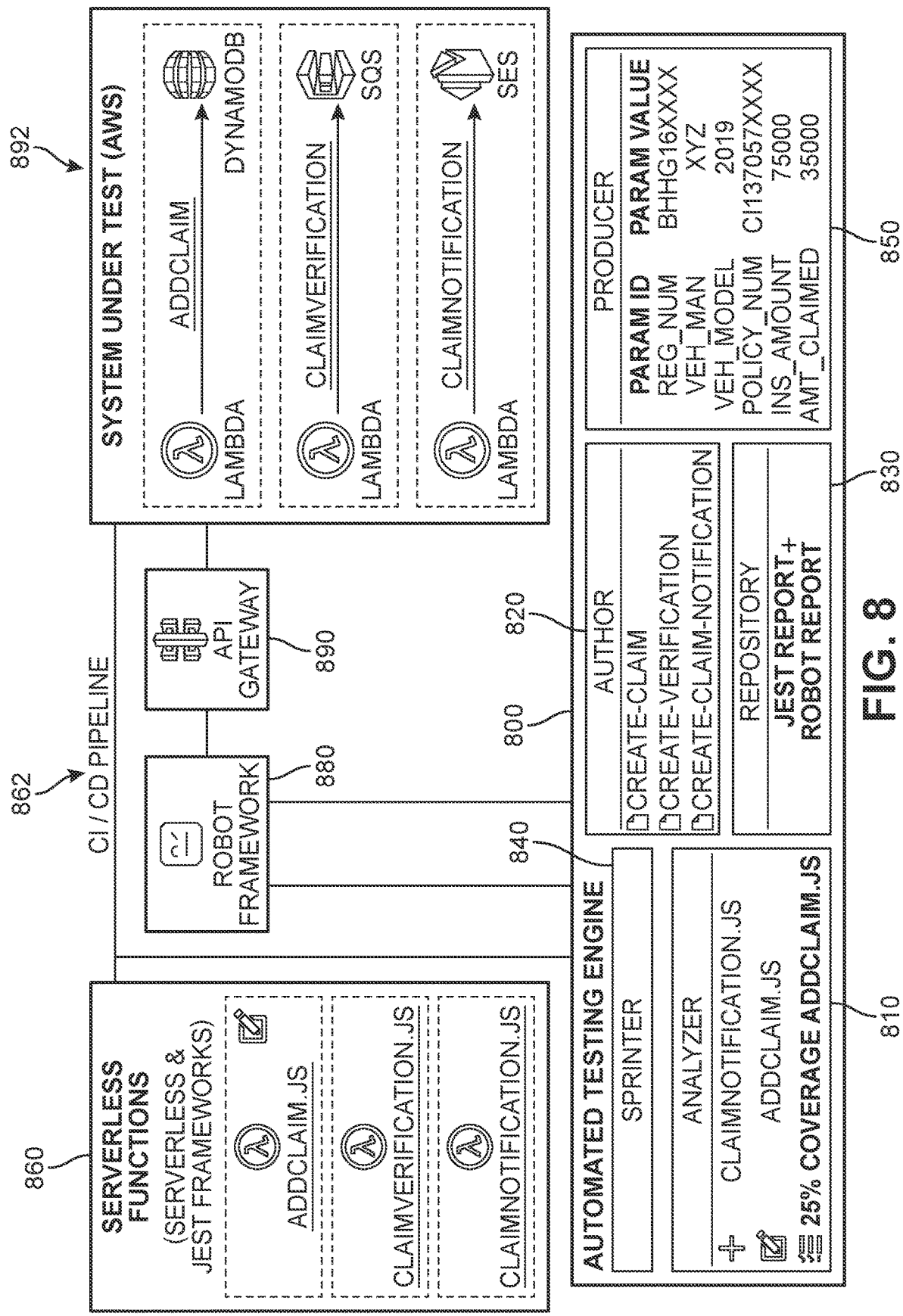
FIG. 8 is a schematic diagram of an example of an environment in which the serverless application testing system is implemented, according to an embodiment.

For purposes of illustration, an example environment 892 implementing an embodiment of the proposed systems comprising an automated testing engine ("engine") 800 is shown in FIG. 8. The engine 800 in environment 892 includes an analyzer module 810, an author module 820, a producer module 830, a sprinter module 840, and a repository module 850. Environment 892 further includes serverless functions 860, a system under test 870, (in this case using AWS®, though in other embodiments, alternate and/or multiple cloud platforms may be involved as a distributed cloud environment), and running along a CI/CD pipeline 862, an automation framework (shown here as Robot framework) 880 and an API gateway 890. It can also be noted that various functions are already deployed, and a variety of services can be used (e.g., Dynamo DB, SQS, SES, Microsoft® Azure SQL, etc.).

In this case, serverless functions (from serverless and Jest frameworks) are depicted as including 'addClaim.js', a 'claimVerification.js', and a 'claimNotification.js' functions. These functions can be received by the analyzer module 810 over the CI/CD pipeline 862. For purposes of this example, the analyzer module 810 has previously received and processed the createVerification.js function. Currently, the analyzer module 810 is processing the addClaim.js function, and has determined that this function is only associated with 25% coverage (the extent to which it has been tested). The claimNotification.js function is pending.

As each of the functions are processed, the author module 820 receives the keywords extracted from the analyzer module 810 and generates scripts for each function. In this example, a script for 'create-claim' based on the addClaim.js has been created. In addition, a script for 'create-verification' based on the claimVerification.js has also been created. When the claimNotification.js function is processed, the author module 820 generates a script for 'create-claim-notification'.

An example of a Robot Script automatically generated by the author module in response to modifications detected by the analyzer module is shown below, simply for purposes of illustration. The below script also reflects how keywords (underlined) extracted using the analyzer module are further used to generate or change an existing API script. It can be seen that the script includes a serverless code, Jest code, and function code.

* Settings *
Library Requestslibrary
* Test Cases *
create-claim
    create session test session https://0k7bmoaued.execute-api.us-east-1.amazonaws.com/dev/add-claim
    ${header}=create dictionary Content-Type=application/json
    ${response}=post request test_session https://0k7bmoaued.execute-api.us-east-1.amazonaws.com/dev/add-claim
{"ownername":"John","policynumber":
"CI02824838AXXXX","insuranceamount":"75000",
"phone":"9191345xxxxx","registration number":
"BHHG16XXXX".
"vehicle_model":"2019"."amount_claimed":"35000",
"vehicle manufacturer":"XYZ", "email":
"test@xxx.com"} ${header}
    ${status_code}=convert to string ${response.status_code}
    should be equal ${status_code} 200
    ${response_body}=convert to string ${response.con
    should contain ${response_body} policy_number
* Test Cases *
create-verification
    create session test_session https://0k7bmoaued.execute-api.us-east-1.amazonaws.com/dev/add-claim
    ${header}=create dictionary Content-Type=application/json At or around the same time, the producer module 830 can assign values to parameters, in this case including values for parameters such as registration_number (BHHG16XXXX), vehicle_manufacturer (XYZ), vehicle_model (2019), policy_number (CI1317057XXXX), insurance_amount (75000), and amountclaimed (35000). In this simple scenario (simply for purposes of illustration) a vehicle insurance claim processing app is being deployed. The test values, along with the generated scripts, are sent to the sprinter module 840, which sends the data with Robot framework 880. The Robot framework 880 executes the auto-generated test scripts using the auto-generated test data in the system under test 870 (via the API gateway 890). In FIG. 8, a first lambda function addClaim is tested with a DynamoDB service, a second lambda function claimVerification is tested with an SQS service, and a third lambda function claimNotification is tested with an SQS service. The results of these tests are returned to the Robot framework 880, which submits the reports for recordation in the repository module 850.

Figure 9:
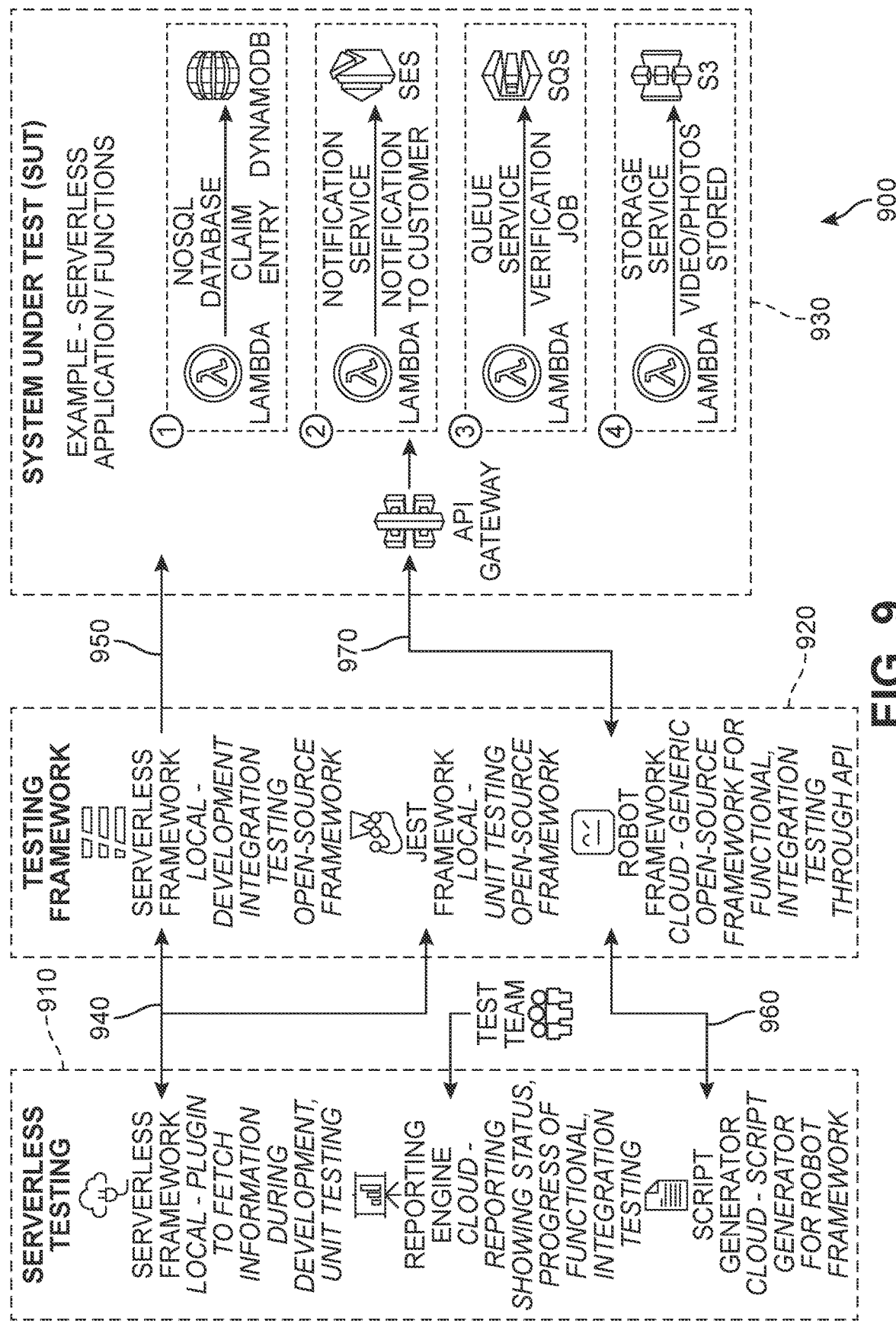
FIG. 9 is a high-level view of an example architecture including an embodiment of the serverless application testing system, according to an embodiment.

For purposes of clarity, a big-picture view of an architecture 900 in which embodiments of the proposed system can be implemented is presented in FIG. 9. In this schematic diagram, the architecture 900 can be seen to include three main blocks between which data is exchanged: a serverless testing block 910, a testing framework block 920, and a system under test block 930. As shown in FIG. 9, the serverless testing block 910 comprises a local plugin that fetches information during app development and unit testing, a cloud reporting engine for presenting status/progress of functions and integration testing, and a cloud script generator for the selected testing framework. In addition, testing framework block 920 includes a local serverless framework for development and integration testing, a local Jest (or other) framework for unit testing, and a cloud Robot (or other) framework for functional integration testing through API. Furthermore, the system under test block 930 includes an API gateway that provides access to services such as DynamoDB, SES, SQS, S3, etc.

The flow and exchange of data through the three blocks is also shown in FIG. 9. For example, the Jest framework can fetch information from either or both of the plugin in the serverless testing block 910 and the serverless framework in the testing framework block 920. The serverless framework can pass the information to the system under test block 930. The developer test team can submit details to the reporting engine in the serverless testing block 910, and test scripts can be exchanged between the script generator of the serverless testing block 910 and the Robot framework of the testing framework block 920. The Robot framework can cause execution of the scripts by passing the test scripts and test data through the API gateway and to the designated services. For example, in FIG. 9, a first lambda function associated with claim entry operation in a database (such as but not limited to a non-relational database like a Non-Structured Query Language (NOSQL) database, MongoDB, Amazon® DynamoDB, IBM® Db2, SAP HANA, Amazon® Relational Database Service (RDS), Ninox®, Redis® Enterprise, Redis®, etc.) can be tested with the DynamoDB service, a second lambda function associated with a notification to customer operation in the notification service can be tested with the SES service, a third lambda function associated with verification jobs in the queue service can be tested in the SQS service, and a fourth lambda function associated with photos/videos storage in the storage service can be tested with the S3 service.

As a specific example scenario, during a claims process event for a given business that has deployed its app as a serverless application with various serverless functions, testing with the proposed systems can occur as follows. In a first step, a claim may be filed by a customer. The claim can include photos and/or videos, and is submitted through a claim portal that is associated with the serverless app. In response, a first function is triggered which creates an entry in DynamoDB. In a second step, a notification is sent to the customer. In addition, a second function is triggered based on the earlier first function (creating an entry in DynamoDB); the second function can send a notification using SES service. In a third step, a verification job is created and is added to the queue for further processing. A verification job is created by the earlier second function, and this third function is sent to the SQS queue. In a fourth step, the submitted photos and/or videos that were uploaded while filing the claim are stored in an S3 bucket. Finally, in a fifth step, the customer can visit the portal to view the progress or any updates related to their claim via DynamoDB.

Thus, as functions are deployed, the five modules comprising the serverless application testing system (analyzer, author, producer, repository and sprinter) can work in conjunction with the serverless automation to maintain app performance and cloud operation quality. In this case, some functions have already been deployed, and some of the corresponding scripts are already generated, along with associated reports. In some cases, multiple developers can make changes, and the system can ensure tests are run to account for each change. As a specific example, in cases where a new app function is developed (e.g., which allows the consumers to make the payment via a different method), the system can need to test said function. For example, the function can allow consumers to pay using the UPI (united payment interface) method, as added by a first developer. Meanwhile, a second developer might add one parameter in the existing function, to check the stock level, as well as a priority product parameter. In both of these cases, it is not possible for a human tester to view these functions via a UI; in other words, the 'check stock level' etc. can be triggered automatically without any UI in front of it. However, the proposed system can ensure that all of these modifications can be tested with appropriate parameter values to provide full testing coverage.

As described herein, the proposed embodiments are designed to significantly improve testing coverage by determining what part of a code is tested, what percentage of branches are tested, etc. in different embodiments, the serverless application testing system scans the part of code which is not covered during unit testing and generates additional test scripts to improve the coverage. After the code is deployed, the system continues to generates scripts including additional scripts to improve coverage. Furthermore, the proposed system offers self-healing—once code gets re-deployed, the serverless application testing system checks for the changes in the Jest data along with the code. Upon finding any changes, the system makes the changes in the already generated scripts to cover the changes and again executes the script using the Robot framework. Thus, without any manual intervention, the system self-heals the scripts. In addition, the proposed system generates scripts for each function irrespective of how the function is triggered. When a function is triggered from another function, the serverless application testing system executes respective script taking the input from earlier script output, thereby achieving the testing of functions triggered within other functions. Finally, the proposed systems provide reliable and comprehensive autonomous serverless testing using the CI/CD pipeline (integrated DevOps) in a serverless framework. As soon as code is published in cloud, the serverless application testing engine triggers the function handler. The function handler scans all the information fetched from the serverless and Jest frameworks, and generates the scripts using a custom-built AI model. Once the scripts are generated, they are executed automatically using Robot framework, thereby achieving completely automated serverless testing.

Figure 10:
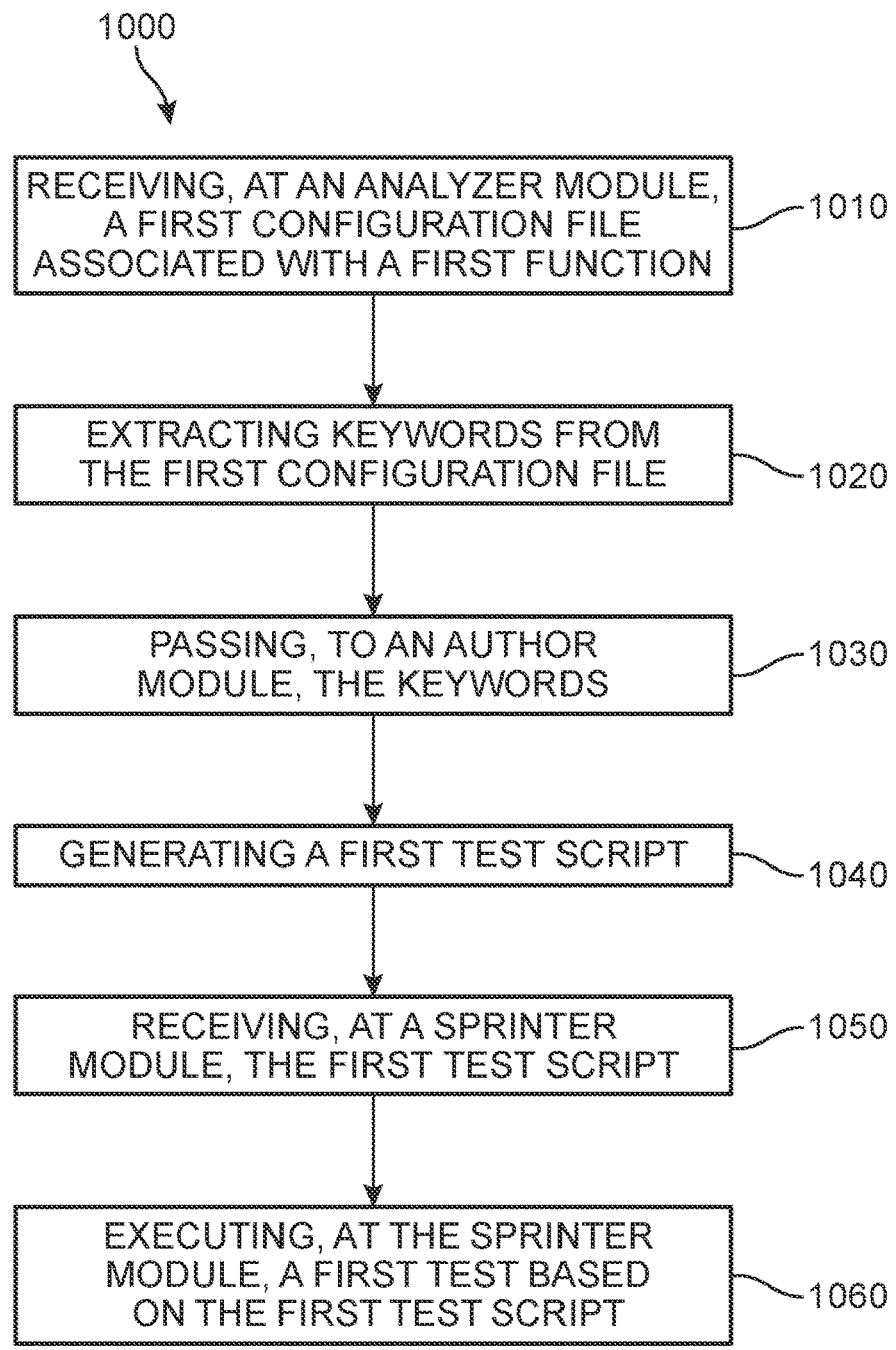
FIG. 10 is a flow chart depicting a method for autonomous serverless application testing, according to an embodiment.

FIG. 10 is a flow chart illustrating an embodiment of a computer-implemented method for autonomous serverless application testing 1000 (or method 1000). The method 1000 includes a first step 1010 of receiving, at an analyzer module of a serverless application testing system, a first configuration file associated with a first function. A second step 1020 includes extracting, at the analyzer module, a plurality of keywords from the first configuration file, and a third step 1030 includes passing, from the analyzer module and to an author module of the serverless application testing system, the plurality of keywords. In addition, the method 1000 includes a fourth step 1040 of generating, via the author module and based on the plurality of keywords, a first test script, which may be performed responsive to receiving the keywords, and a fifth step 1050 of receiving, at a sprinter module of the serverless application testing system, the first test script from the author module. Furthermore, the method 1000 includes a sixth step 1060 of executing a first test via the sprinter module based on the first test script in response to receiving the first test script, for example by using an automation framework that is configured to execute API scripts.

In other embodiments, the method 1000 may include additional steps or aspects. In one example, the method 1000 also includes steps of receiving, at a producer module of the serverless application testing system, the first configuration file, and generating, via the producer module and based on the first configuration file, first test data. In another embodiment, the method also includes receiving, at the sprinter module, the first test data from the producer module, wherein the first test is executed based on the first test script and the first test data. In some embodiments, each of the plurality of keywords corresponds to detection of one of a new function, a modified function, serverless framework information, and code lines which are not tested during unit testing. In one embodiment, the analyzer module also receives data from one or more of function code and code generated by a unit testing framework. In some embodiments, the method also includes a step of generating and storing, at a repository module of the serverless application testing system, a report from the automation framework, the report including results of a first test performed by the serverless application based on the first test script. In different embodiments, the method 1000 can also include steps of modifying the first function to produce a modified first function, detecting the modification to the first function via the analyzer module, and automatically generating, at the author module and in response to detecting the modification, a second test script that is configured to test the modified first function. In other words, modifications to functions that had already been tested by the proposed system will elicit or trigger an automatic re-testing to ensure the function-as-modified has also been tested.

In another example, additional steps can include deploying the first function at a first time, automatically generating the first test script to test the first function at a second time subsequent to the first time, modifying the first function at a third time subsequent to the second time to produce a modified first function, detecting the modification to the first function via the analyzer module at a fourth time subsequent to the third time, and automatically generating, at the author module and in response to detecting the modification, a second script that is configured to test the modified first function. In some embodiments, the first function is triggered based on output from a second function, and the first test for the first function is executed using output provided by the second function. In another example, the serverless application testing system is configured to operate in conjunction with a CI/CD pipeline in a serverless framework environment. In one embodiment, the analyzer module uses natural language processing techniques to extract the plurality of keywords from the first configuration file. In some embodiments, the method 1000 also includes appending the first test data to the first test script before the information (appended script) is sent to the sprinter module. In another example, the method further includes steps of deploying a code including a plurality of functions, the plurality of functions including the first function, performing a unit test of the code, and determining, by the analyzer module and based on the plurality of keywords, that the first function was untested (i.e., the first test script directed toward testing of the first function is automatically generated because the system determined the first function had not been tested during the unit test).

The examples described herein present one of many possible different implementation contexts. In that respect, the technical solutions are not limited in their application to the architectures and systems shown in the figures, but are applicable to many other implementations, architectures, and processing.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus can include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment 222, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

An "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In addition to the algorithms and techniques described above, one or more of the following techniques may be utilized by one or more of the disclosed embodiments: RPA, Mongo DB, AI Modules such as Python, Image to Text, optical character recognition (OCR), Computer Vision, Image comparison (phase comparison), Image Validation (image to text, then text to text comparison), Learning Algorithms, Similarity Analytics, Sequencing algorithms, Random Forest, graph Convolutional Neural Network (gCNN), Data Clustering with weighted data, Data Visualization, Rocket Chat, and D3JS.

For purposes of the current description, the terms "organization," "client," "organization resources," or "client resources" refer to database resources (i.e., data, metadata, programs, and other resources) that are maintained in a central multi-tenant database for access by users who have appropriate access privileges. Such resources can generally be managed by a server and data storage system maintained by a platform provider, as opposed to computers within the actual client (tenant) businesses themselves. In addition, a Cloud Service Provider (CSP) may include an organization that provides a cloud computing resource to a client device and/or a user of a client device. Furthermore, the term "component" refers to software applications and other system modules and features comprising or supporting the multi-tenant architecture.

In one implementation, the serverless application testing systems described herein include hardware data storage. Among other operational data, the hardware data storage may store instantiation rules and instantiation metadata. Instantiation circuitry interprets the requirement syntax and executes the instantiation rules with input from the instantiation metadata to issue infrastructure instantiation requests to cause instantiation of the resources requested by the developers. Further, state file unification circuitry facilitates developer collaboration by receiving and managing state files for the individual developer projects. In addition, in some embodiments, the serverless application testing systems described herein includes a validation circuitry. The validation circuitry helps to ensure that the instantiation requests that the serverless application testing systems described herein makes to the infrastructure providers are completed correctly, cause the expected infrastructure results, and that the infrastructure remains correct over time. To that end, the validation circuitry issues validation requests to the infrastructure providers. The infrastructure providers return ICV messages to the serverless application testing systems described herein. Examples of ICV messages include responses to validation requests, responses to instantiation requests, and infrastructure status messages.

The instantiation circuitry, state file unification circuitry, validation circuitry, requests, and other features of the serverless application testing systems described herein improve the operation and function of the underlying computer hardware itself. That is, these features (among others described) are specific improvements in way that the underlying computer system operates and solve technical challenges with infrastructure instantiation and validation, as well as developer collaborating in serverless execution environments. The improvements facilitate more efficient, accurate, consistent, and precise building of resources that can operate properly in serverless function environments. The improved functioning of the underlying computer hardware itself achieves further technical benefits. For example, the serverless application testing systems described herein avoids lack of automation, reduces manual intervention, reduces the possibility for human error, and therefore increases infrastructure instantiation efficiency and reduces wait times for correct resource setup and execution. In addition, the serverless application testing systems described herein provides additional abstraction, so that developers need not be complete experts in complex infrastructure as code (IaC) syntaxes. The developers may instead concentrate on the particular goals of their projects with less time and energy spent on mastering intricate IaC coding.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method for autonomous serverless application testing, the method comprising:
receiving, at an analyzer module of a serverless application testing system, a first configuration file associated with one or more functions, the one or more functions including a first function of a code, serverless framework data regarding cloud deployment for the code, and a unit test report for the first configuration file;
extracting, at the analyzer module, a plurality of keywords from each of the first configuration file and the serverless framework data;
outputting, via an artificial intelligence (AI) analyzer model of the analyzer module and based on a comparison of the extracted keywords with the unit test report, a subset of the extracted keywords that are deemed by the model to not be present in the unit test report and to represent untested aspects of the one or more functions, including any new functions, changes in existing functions, or other code lines of the first configuration file that were untested during unit testing;
passing, from the analyzer module and to an author module of the serverless application testing system, the subset of the extracted keywords;
generating, via the author module and based on the subset of the extracted keywords, a first test script targeting the untested aspects of the one or more functions;
receiving, at a producer module of the serverless application testing system, the first configuration file;
generating, via the producer module using random generation logic and based on the first configuration file, first test data;
comparing, at the analyzer module, the first function to an earlier version of the code to detect changes that have occurred in the first function;
detecting, at the analyzer module, a new field has been added to the first function and causing the author module to update the first test script to include the new field thereby producing a second test script;
receiving, at a sprinter module of the serverless application testing system, the second test script from the author module and the first test data from the producer module; and
responsive to receiving the second test script, executing a first test via the sprinter module based on the second test script and the first test data, thereby improving the code's validation coverage,
wherein the analyzer module, the author module, the sprinter module, and the producer module are stored in a memory of the serverless application testing system.

2. The method of claim 1, further comprising:
modifying the first function to produce a modified first function;
detecting the modification to the first function via the analyzer module; and
automatically generating, at the author module and in response to detecting the modification, a third test script that is configured to test the modified first function.

3. The method of claim 1, wherein the first configuration file is a YML file.

4. The method of claim 1, wherein the serverless application testing system is configured to operate in conjunction with a continuous integration/continuous delivery (CI/CD) pipeline in a serverless framework environment.

5. The method of claim 1, wherein the analyzer module uses natural language processing techniques to extract the plurality of keywords from the first configuration file.

6. The method of claim 1, further comprising:
deploying the code including the first function;
performing a unit test of the code; and
determining, by the analyzer module and based on the subset of keywords, that the first function was untested during the unit test of the code, wherein the analyzer module passes the subset of keywords to the author module in response to determining the first function was untested.

7. A non-transitory computer-readable medium storing software comprising instructions executable by one or more computers of a system for autonomous serverless application testing which, upon such execution, cause the one or more computers to:
receive, at an analyzer module of a serverless application testing system, a first configuration file associated with one or more functions, the one or more functions including a first function of a code, serverless framework data regarding cloud deployment for the code, and a unit test report for the first configuration file;
extract, at the analyzer module, a plurality of keywords from each of the first configuration file and the serverless framework data;
output, via an artificial intelligence (AI) analyzer model of the analyzer module and based on a comparison of the extracted keywords with the unit test report, a subset of the extracted keywords that are deemed by the model to not be present in the unit test report and to represent untested aspects of the one or more functions, including any new functions, changes in existing functions, or other code lines of the first configuration file that were untested during unit testing;
pass, from the analyzer module and to an author module of the serverless application testing system, the subset of the extracted keywords;
generate, via the author module and based on the subset of the extracted keywords, a first test script targeting the untested aspects of the one or more functions;
receive, at a producer module of the serverless application testing system, the first configuration file;
generate, via the producer module using random generation logic and based on the first configuration file, first test data;
compare, at the analyzer module, the first function to an earlier version of the code to detect changes that have occurred in the first function;
detect, at the analyzer module, a new field has been added to the first function and causing the author module to update the first test script to include the new field thereby producing a second test script;
receive, at a sprinter module of the serverless application testing system, the second test script from the author module and the first test data from the producer module; and
responsive to receiving the second test script, execute a first test via the sprinter module based on the second test script and the first test data, thereby improving the code's validation coverage,
wherein the analyzer module, the author module, the sprinter module, and the producer module are stored in a memory of the serverless application testing system.

8. The non-transitory computer-readable medium storing software of claim 7, wherein the instructions further cause the one or more computers to:
modify the first function to produce a modified first function;
detect the modification to the first function via the analyzer module; and
automatically generate, at the author module and in response to detecting the modification, a third test script that is configured to test the modified first function.

9. The non-transitory computer-readable medium storing software of claim 7, wherein the first configuration file is a YML file.

10. The non-transitory computer-readable medium storing software of claim 7, wherein the serverless application testing system is configured to operate in conjunction with a continuous integration/continuous delivery (CI/CD) pipeline in a serverless framework environment.

11. The non-transitory computer-readable medium storing software of claim 10, wherein the analyzer module uses natural language processing techniques to extract the plurality of keywords from the first configuration file.

12. A system for autonomous serverless application testing comprising one or more computers and one or more storage devices storing instructions that are operable, when executed by the one or more computers, to cause the one or more computers to:
- receive, at an analyzer module of a serverless application testing system, a first configuration file associated with one or more functions, the one or more functions including a first function of a code, serverless framework data regarding cloud deployment for the code, and a unit test report for the first configuration file;
- extract, at the analyzer module, a plurality of keywords from each of the first configuration file and the serverless framework data;
- output, via an artificial intelligence (AI) analyzer model of the analyzer module and based on a comparison of the extracted keywords with the unit test report, a subset of the extracted keywords that are deemed by the model to not be present in the unit test report and to represent untested aspects of the one or more functions, including any new functions, changes in existing functions, or other code lines of the first configuration file that were untested during unit testing;
- pass, from the analyzer module and to an author module of the serverless application testing system, the subset of the extracted keywords;
- generate, via the author module and based on the subset of the extracted keywords, a first test script targeting the untested aspects of the one or more functions;
- receive, at a producer module of the serverless application testing system, the first configuration file;
- generate, via the producer module using random generation logic and based on the first configuration file, first test data;
- compare, at the analyzer module, the first function to an earlier version of the code to detect changes that have occurred in the first function;
- detect, at the analyzer module, a new field has been added to the first function and causing the author module to update the first test script to include the new field thereby producing a second test script;
- receive, at a sprinter module of the serverless application testing system, the second test script from the author module and the first test data from the producer module; and
- responsive to receiving the second test script, execute a first test via the sprinter module based on the second test script and the first test data, thereby improving the code's validation coverage,
- wherein the analyzer module, the author module, the sprinter module, and the producer module are stored in a memory of the serverless application testing system.

13. The system of claim 12, wherein the instructions further cause the one or more computers to:
- modify the first function to produce a modified first function;
- detect the modification to the first function via the analyzer module; and
- automatically generate, at the author module and in response to detecting the modification, a third test script that is configured to test the modified first function.

14. The system of claim 12, wherein the first configuration file is a YML file.

15. The system of claim 12, wherein the serverless application testing system is configured to operate in conjunction with a continuous integration/continuous delivery (CI/CD) pipeline in a serverless framework environment.

16. The system of claim 12, wherein the analyzer module uses natural language processing techniques to extract the plurality of keywords from the first configuration files.

* * * * *